(12) United States Patent
Agrawal et al.

(10) Patent No.: US 12,001,573 B2
(45) Date of Patent: Jun. 4, 2024

(54) CONTENT CONSUMPTION MONITORING

(71) Applicant: MOTOROLA MOBILITY LLC, Chicago, IL (US)

(72) Inventors: Amit Kumar Agrawal, Bangalore (IN); Alexandre Neves Creto, Sao Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 95 days.

(21) Appl. No.: 17/196,109

(22) Filed: Mar. 9, 2021

(65) Prior Publication Data

US 2022/0292207 A1  Sep. 15, 2022

(51) Int. Cl.
*G06F 21/62* (2013.01)
*G06F 21/10* (2013.01)
(Continued)

(52) U.S. Cl.
CPC .............. *G06F 21/62* (2013.01); *G06F 21/10* (2013.01); *G06F 21/31* (2013.01);
(Continued)

(58) Field of Classification Search
CPC .......... G06F 21/62; G06F 21/31; G06F 3/013; H04L 63/0428; H04L 63/08; H04L 63/102; H04L 67/535; H04L 67/60
See application file for complete search history.

(56) References Cited

U.S. PATENT DOCUMENTS 10,168,771 B2 * 1/2019 Abou Mahmoud .. G06F 3/0481
10,810,604 B2 * 10/2020 Livhits ............... G06Q 30/0201
(Continued)

FOREIGN PATENT DOCUMENTS

CN  101379484 A  *  3/2009  ......... G06F 16/9577

OTHER PUBLICATIONS

"Finding an Efficient Threshold for Fixation Detection in Eye Gaze Tracking"—Tangnimitchok et al., Florida International University, 2016 https://cake.fiu.edu/Publications/Tangnimitchok+al-16-FA. Finding_Efficient_Threshold_Fixation_Detection_Eye_Gaze_Tracking_Springer_downloaded.pdf (Year: 2016).*

(Continued)

*Primary Examiner* — Randy A Scott
(74) *Attorney, Agent, or Firm* — Isidore PLLC

(57) ABSTRACT

An electronic device, method and computer program product enable detecting user attention to dynamic content and enabling subsequent user access. The electronic device includes display device(s), a memory containing a content consumption monitoring (CCM) application, and a controller communicatively coupled to the display device(s) and the memory. The controller executes the CCM application to configure the electronic device to provide functionality of the detection of user attention including retrieving content from source(s) of content. The functionality includes monitoring presentation of, and user attention to, portion(s) of the content on the display device(s). In response to detecting that a period of time associated with the user attention to a particular portion of the content exceeds a threshold time for consuming the particular portion of the content, the functionality includes storing information associated with the particular portion of the content (e.g., location, a copy of content, and metadata) for subsequent user access.

19 Claims, 8 Drawing Sheets

(51) Int. Cl.
    *G06F 21/31*     (2013.01)
    *H04L 9/40*     (2022.01)
    *H04L 29/06*     (2006.01)
    *H04L 29/08*     (2006.01)
    *H04L 67/50*     (2022.01)
    *H04L 67/60*     (2022.01)
    *G06F 3/01*     (2006.01)

(52) U.S. Cl.
    CPC .......... *H04L 63/0428* (2013.01); *H04L 63/08* (2013.01); *H04L 63/102* (2013.01); *H04L 67/535* (2022.05); *H04L 67/60* (2022.05); *G06F 3/013* (2013.01)

(56) References Cited

U.S. PATENT DOCUMENTS

2013/0332386 A1* 12/2013 Billmaier ............... G06Q 30/02
    705/347
2016/0012475 A1* 1/2016 Liu .................... G06Q 30/0251
    705/14.49

OTHER PUBLICATIONS

"Using Dual Eye Tracking to Uncover Personal Gaze Patterns During Social Interaction"—Rogers et al., Scientific Reports, Mar. 9, 2018 https://www.nature.com/articles/s41598-018-22726-7 (Year: 2018).*

* cited by examiner

Capture a screenshot of the display device via an image capturing device
526

Capture a zoomed-in image of the particular portion of the content on the screen
528

Perform optical character recognition of the particular portion of the content
530

Identify and copy the metadata associated with the particular portion of the content
532

Identify one or more of a date, a time, and a location of the particular portion of the content
534

Identify an access path of the particular portion of the content
536

FIG. 5C

CONTENT CONSUMPTION MONITORING

1. TECHNICAL FIELD

The present disclosure relates generally to electronic devices having display device(s), and more particularly to electronic devices that track user consumption of content presented on the display device(s).

2. DESCRIPTION OF THE RELATED ART

Electronic devices such as smart phones, tablets, laptops, workstations, etc., are frequently used to retrieve and review content. The content can be written or spoken word, graphics elements, music, or data. Certain content items can be static and specifically locatable at a particular storage address, enabling a user to "bookmark", "like", tag as a "favorite", or otherwise designate a particular address for later reference. Certain applications or network providers of content automate this tagging and tracking of frequented storage addresses by maintaining a history of access. Such tracking can be unwanted due to user privacy concerns and can be limited to links viewed via a specific application. In addition, the history can become cumbersome by including links that were inadvertently accessed or only momentary displayed without the user paying any attention to the content.

Social media is a source of news and commentary, characterized by being an aggregation of dynamic content that is frequently changed. A particular application can have an endless stream of content that changes each time the particular application is accessed. During a single session, the user can scroll through a stream of content, ignoring certain sections while paying attention to other particular sections. Interacting with the content, such as by posting a response or a reaction, can create a record that enables the user to subsequently access a particular portion of the content again. However, such designations also enable others to note interest of this user with the content, which may be undesirable from a privacy standpoint. In addition, particular content items may not provide a way for a user to manually select the content item for later access.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 5A-5C (FIG. 5) present a flow diagram of a method for detecting user attention to dynamic content and enabling subsequent user access, according to one or more embodiments.

DETAILED DESCRIPTION

Figure 1:
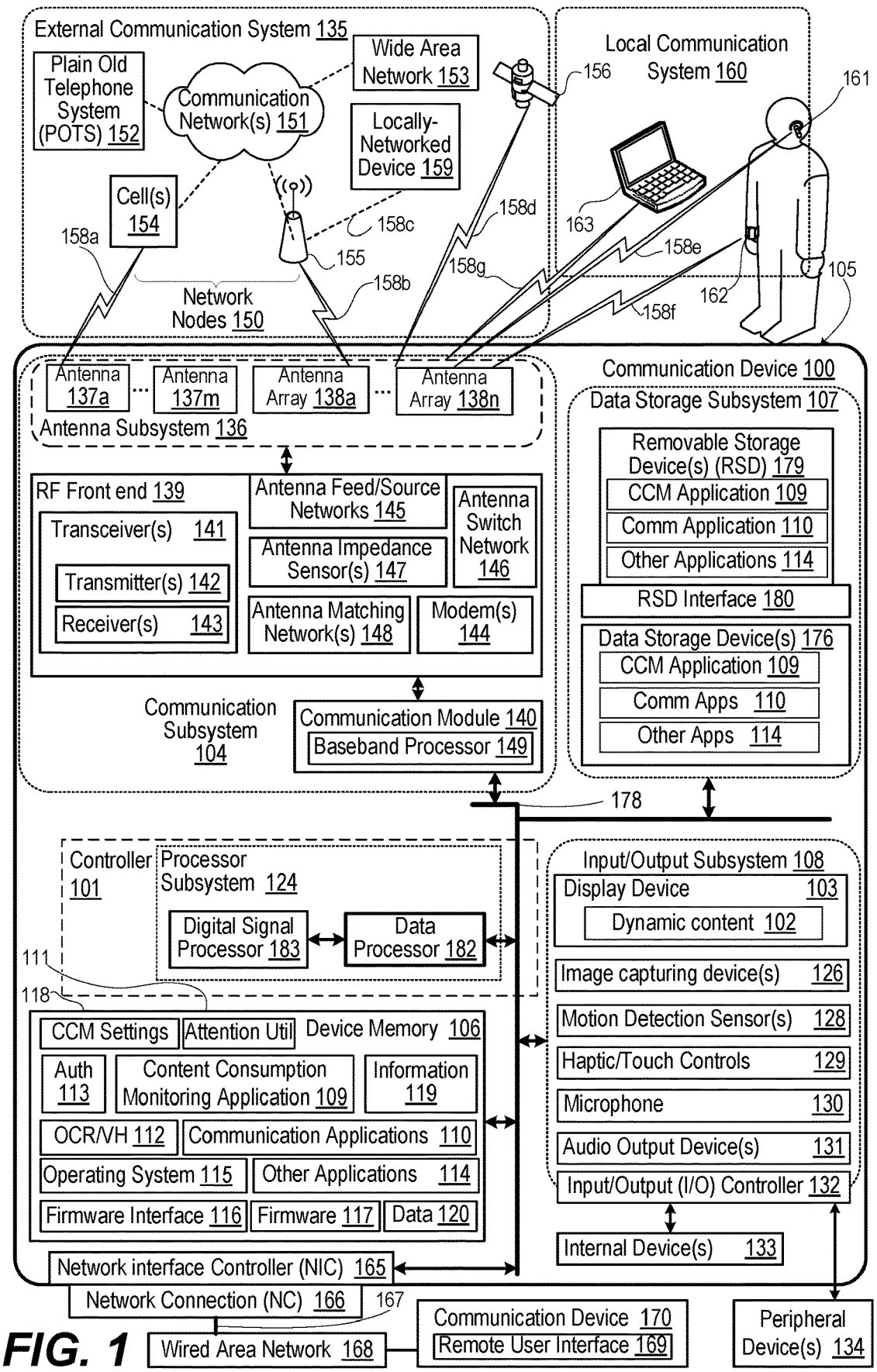
FIG. 1 depicts a functional block diagram of a communication device with at least one user display device for presenting dynamic content and within which the features of the present disclosure are advantageously implemented, according to one or more embodiments.

According to aspects of the present disclosure, an electronic device, method, and computer program product enable device-based detection of user attention to specific dynamic content to facilitate subsequent user access to the specific content. The electronic device includes at least one display device, a memory containing a content consumption monitoring (CCM) application, and a controller communicatively coupled to the at least one display device and the memory. The controller executes the CCM application to configure the electronic device to provide functionality corresponding with the detection of the user attention. The functionality includes retrieving content from at least one source of content. The functionality includes monitoring presentation of one or more portion(s) of the content on the at least one display device. The functionality includes monitoring user attention to the presentation of the one or more portion(s) of the content. In response to detecting that a length of time associated with the user attention to a particular portion of the content exceeds a threshold time for consuming the particular portion of the content, the functionality includes storing information that comprises one or more of: (i) a location of; (ii) a copy of; and (iii) metadata associated with the particular portion of the content. The functionality includes enabling subsequent user access to the stored information.

For clarity, the present disclosure discusses dynamic content, especially dynamic content that is an aggregation of multiple viewable elements that are not readily tagged for later user access. Aspects of the present disclosure can also incorporate traditional techniques for tracking content that a user has taken an action to designate for later retrieval. As an example, a user can bookmark a particular uniform resource locator (URL) for network content. As another example, a user can add a content address to a favorite list. As an additional example, a user can create a shortcut to content. Information about the manually selected dynamic content can be included along with automatically collected information of user consumption of the dynamic content. In one or more embodiments, the capturing of information, which includes a complete copy, and which is based on detected user attention thereto (i.e., without express user selection), can be limited to dynamic content, as static content can normally be later retrieved/accessed. As an example, information for static content can be limited to synopsis data and a location. The capturing allows the user or others to later retrieve the content when the dynamic content has been updated or removed. Limiting the scope of what information (or type of information, e.g., dynamic versus static) is captured conserves storage space. In one or more embodiments, screenshot capture may be used for dynamic content, where the entire content presented on screen is preserved for later access. Thus, the present disclosure is not dependent on content providers to maintain the dynamic content for later access.

In one or more alternate embodiments, both static and dynamic content that is the focus of user attention (consumption) is captured. As an example of dynamic content, social media is a source of news and commentary, characterized by being an aggregation of content that is frequently (dynamically) changed. A particular application can have an endless stream of content that changes each time the particular application is accessed. As an example of static content, some websites archive previously featured articles at a static network address that does not change. According to one aspect, the present disclosure enables the monitoring and storing of content across a content ecosystem by leveraging system access to multiple display devices to independently obtain information about the various content, including screenshots.

Additionally, in one or more embodiments, the features of the present disclosure can be incorporated into a single application, whereby the functionality of dynamically capturing content is applied to content that is retrieved and presented on a display device via the single application (e.g., a web browser). However, the present disclosure can also be applied to the overall device usage, where the capturing and storing of user-consumed content are not limited to a single application. Features of the present disclosure can be implemented at a system level without direct incorporated into each and every application that is being monitored.

In one or more embodiments that involve integrating the features of the disclosure into a single application, the application is enhanced with functional software modules that enable automatic monitoring and capture of consumed dynamic content. As an example, a conventional application can track what files have been recently opened. The present disclosure can add features that go beyond a history listing of storage addresses. According to one aspect, information is captured that is meaningful to the user about particular portions that were consumed, making subsequent queries and browsing more efficient and/or effective for the user. The information about the particular portions consumed by the user can be analyzed to enable specific queries to be supported. The information can include a complete copy of the particular portions of the dynamic content, enabling retrieval even if the original copy has become irretrievable.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device, and more particularly communication device 100, which is managed by controller 101, in an operating environment within which the features of the present disclosure are advantageously implemented. Controller 101 monitors dynamic content 102 presented on at least one display device 103. Controller 101 determines an amount (or an elapsed time) of user attention to particular content items. In response to detecting that the period of time associated with the user attention to a particular portion of the content exceeds a threshold time for consuming the particular portion of the content, controller 101 stores information that enables subsequent user access to the stored information, which can include the particular portion of content.

Communication device 100 can be one of a host of different types of devices, including but not limited to, a mobile cellular phone, satellite phone, or smart-phone, a laptop, a net-book, an ultra-book, a networked smart watch, or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100). In one or more embodiments, communication device 100 encompasses functional components within housing 105. In one or more embodiments, communication device 100 has functional components encompassed by more than one housing 105.

Referring again to the specific component makeup and the associated functionality of communication device 100 of FIG. 1. In one or more embodiments, communication device 100 includes communication subsystem 104, device memory 106, data storage subsystem 107, and input/output (I/O) subsystem 108. Device memory 106 and each subsystem (104, 107, and 108) are managed by controller 101. Device memory 106 includes program code and applications such as content consumption monitoring (CCM) application 109, communication applications 110, user attention utility 111, optical character recognition/view hierarchy (OCR/VH) utility 112, authentication utility 113, and other application(s) 114 that retrieve and present dynamic content 102. Device memory 106 further includes operating system (OS) 115, firmware interface 116, such as basic input/output system (BIOS) or Uniform Extensible Firmware Interface (UEFI), and firmware 117. Device memory 106 includes CCM settings data 118, user attention information 119, or other computer data 120 used by CCM application 109. Processor subsystem 124 of controller 101 executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of CCM application 109 to monitor dynamic content 102.

I/O subsystem 108 includes image capturing device(s) 126. I/O subsystem 108 includes user interface devices such as at least one display device 103, motion detection sensors 128, touch/haptic controls 129, microphone 130, and audio output device(s) 131. I/O subsystem 108 also includes I/O controller 132. In one or more embodiments, motion detection sensors 128 can detect an orientation and movement of the communication device 100. In one or more embodiments, motion detection sensors 128 are used for functions other than user inputs, such as detecting an impending ground impact. I/O controller 132 connects to internal devices 133, which are internal to housing 105 and to peripheral devices 134, such as external speakers, which are external to housing 105 of communication device 100. Examples of internal devices 133 are computing, storage, communication, or sensing components depicted within housing 105. I/O controller 132 supports the necessary configuration of connectors, electrical power, communication protocols, and data buffering to act as an interface to internal devices 133 and peripheral devices 134 to other components of communication device 100 that use a different configuration for inputs and outputs.

Communication subsystem 104 of communication device 100 enables wireless communication with external communication system 135. Communication subsystem 104 includes antenna subsystem 136 having lower band antennas 137a-137m and higher band antenna arrays 138a-138n that can be attached in/at different portions of housing 105. Communication subsystem 104 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 104 includes baseband processor 149 that communicates with controller 101 and RF front end 139. Baseband processor 149 operates in baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedance of transceivers 141. Antenna matching network(s) 148 can also be used to detune the impedance of lower band antennas 137a-137m to not match the impedance of transceivers 141 in order to electromagnetically isolate a particular antenna.

In one or more embodiments, controller 101, via communication subsystem 104, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cells 154 such as provided by base stations or base nodes that support cellular OTA communication using radio access technology (RAT) as part of a radio access network (RAN).

In one or more embodiments, network nodes 150 can be access node(s) 155 that support wireless OTA communication. Communication subsystem 104 can receive OTA communication from location services such as provided by global positioning system (GPS) satellites 156. Communication subsystem 104 communicates via OTA communication channel(s) 158a with cells 154. Communication subsystem 104 communicates via wireless communication channel(s) 158b with access node 155. In one or more particular embodiments, access node 155 supports communication using one or more IEEE 802.11 wireless local area network (WLAN) protocols. In one or more particular embodiments, communication subsystem 104 communicates with one or more locally networked devices 159 via wired or wireless link 158c provided by access node 155. Communication subsystem 104 receives downlink broadcast channel(s) 158d from GPS satellites 156 to obtain geospatial location information.

In one or more embodiments, controller 101, via communication subsystem 104, performs multiple types of OTA communication with local communication system 160. In one or more embodiments, local communication system 160 includes wireless headset 161 and smart watch 162 that are coupled to communication device 100 to form a personal access network (PAN). Communication subsystem 104 communicates via low power wireless communication channel(s) 158e with headset 161. Communication subsystem 104 communicates via second low power wireless communication channel(s) 158f, such as Bluetooth, with smart watch 162. In one or more particular embodiments, communication subsystem 104 communicates with other communication device(s) 163 via wireless link 158g to form an ad hoc network.

In one or more embodiments, I/O subsystem 108 includes network interface controller (NIC) 165 with a network connection (NC) 166 on housing 105. Network cable 167 connects NC 166 to wired area network 168. Wired area network 168 can be a local area network (LAN), a campus area network (CAN), a metropolitan area network (MAN), or a wide area network (WAN). For example, NC 166 can be an Ethernet connection. Remote user interface (UI) 169 presented on communication device 170 is communicatively coupled to wired area network 168.

Data storage subsystem 107 of communication device 100 includes data storage device(s) 176. Controller 101 is communicatively connected, via system interlink 178, to data storage device(s) 176. Data storage subsystem 107 provides applications, program code, and stored data on nonvolatile storage that is accessible by controller 101. For example, data storage subsystem 107 can provide a selection of program code and applications such as CCM application 109, optical character recognition (OCR) utility 112, and other application(s) 114 that use communication services. These applications can be loaded into device memory 106 for execution by controller 101. In one or more embodiments, data storage device(s) 176 can include hard disk drives (HDDs), optical disk drives, and/or solid-state drives (SSDs), etc. Data storage subsystem 107 of communication device 100 can include removable storage device(s) (RSD(s)) 179, which is received in RSD interface 180. Controller 101 is communicatively connected to RSD 179, via system interlink 178 and RSD interface 180. In one or more embodiments, RSD 179 is a non-transitory computer program product or computer readable storage device. Controller 101 can access RSD 179 or data storage device(s) 176 to provision communication device 100 with program code, such as CCM application 109 and other applications 114. When executed by controller 101, the program code causes or configures communication device 100 to provide the dynamic content monitoring and tracking functionality described herein.

Controller 101 includes processor subsystem 124, which includes one or more central processing units (CPUs), depicted as data processor 182. Processor subsystem 124 can include one or more digital signal processors 183 such as baseband processor 149 of communication module 140. Digital signal processors 183 are integrated with data processor 182 or are communicatively coupled to data processor 182. In one or more alternate embodiments (not depicted), controller 101 can further include distributed processing and control components that are peripheral or remote to housing 105 or are grouped with other components, such as I/O subsystem 108. Data processor 182 is communicatively coupled, via system interlink 178, to device memory 106. In one or more embodiments, controller 101 of communication device 100 is communicatively coupled via system interlink 178 to communication subsystem 104, data storage subsystem 107, and input/output subsystem 107. System interlink 178 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 178) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Figure 2:
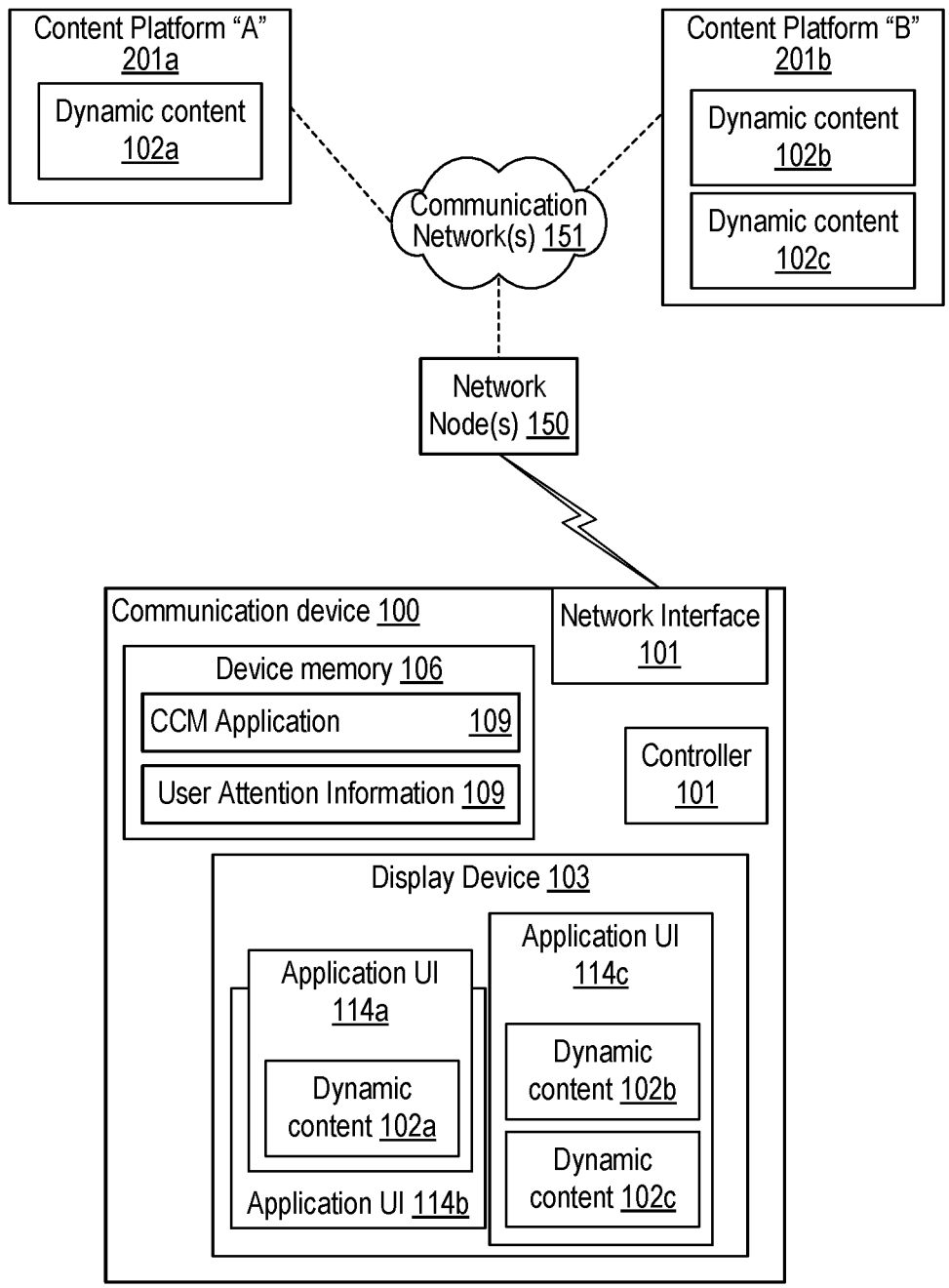
FIG. 2 depicts a communication diagram of the communication device of FIG. 1 communicatively connected via a network to sources of content, according to one or more embodiments.

FIG. 2 depicts a communication diagram of communication device 100 communicatively connected via communication network 151 (FIG. 1) or wired area network 169 (FIG. 1) to sources of content, content platform "A" 201a and content platform "B" 201b, via network node(s) 150 and communication network(s) 151. Content platform "A" 201a provides dynamic content 102a. Content platform "B" 201b provides dynamic content 102b and dynamic content 102c. Communication device 100 includes at least one display device 103 that presents dynamic content 102a in application user interface (UI) 114a. Controller 101 monitors presentation of dynamic content 102a and detects user attention to dynamic content 102a. Controller 101 can also monitor other display elements, such as application UI 114b that has a lower view hierarchy, being currently obscured by application UI 114a. Controller 101 can also monitor and detect user attention to another application UI 114c that is simultaneously presented with application UI 114a. In one of more embodiments, application UI 114c can present more than one dynamic content 102b-102c. As an example, communication device 100 can have one or more display devices 103 that enable simultaneous presenting of multiple browser and application windows for monitoring social and news postings. A particular social media application can have multiple segregated panels or sub-windows that present different dynamic content for consuming. In one or more embodiments, communication device 100 has display device 103 that supports a single application UI 114a presenting single dynamic content 102a. Different application UIs 114a-114c can be sequentially presented and monitored by controller 101. Controller 101 executes CCM application 109 stored in device memory 106 to retrieve dynamic content 102a-102b and to monitor user consumption of presentation of one or more portions of dynamic content 102a-102b on at least one display device 103. In response to determining that the amount of time associated with user attention to a particular portion of the content exceeds a threshold time for consuming the particular portion of the content, controller 101 stores user attention information 119 that comprises one or more of: (i) a storage location address or path to the particular portion of the dynamic content 102a-102b; (ii) a copy of the particular portion of the dynamic content 102a-102b; and (iii) metadata associated with the particular portion of dynamic content 102a-102b. The storing of user attention information 119 enables subsequent user access to the stored information. In one or more embodiments, user attention information 119 can be stored in a portion of device memory 106 dedicated to CCM application 109 to independently provide query results and browsing opportunities to the user. In one or more embodiments, user attention information 119 can be stored in the portion of device memory 106 maintained by CCM application 109 that is read accessible by application UIs 114a-114c to individually provide query results and browsing opportunities to the user. The query results may be limited to dynamic content 102a-102c that is accessible by the particular application UIs 114a-114c. In one or more embodiments, CCM application 109 can integrated with application UIs 114a-114c to enhance functionality of content monitoring and tracking data maintained by application UIs 114a-114c.

Figure 3:
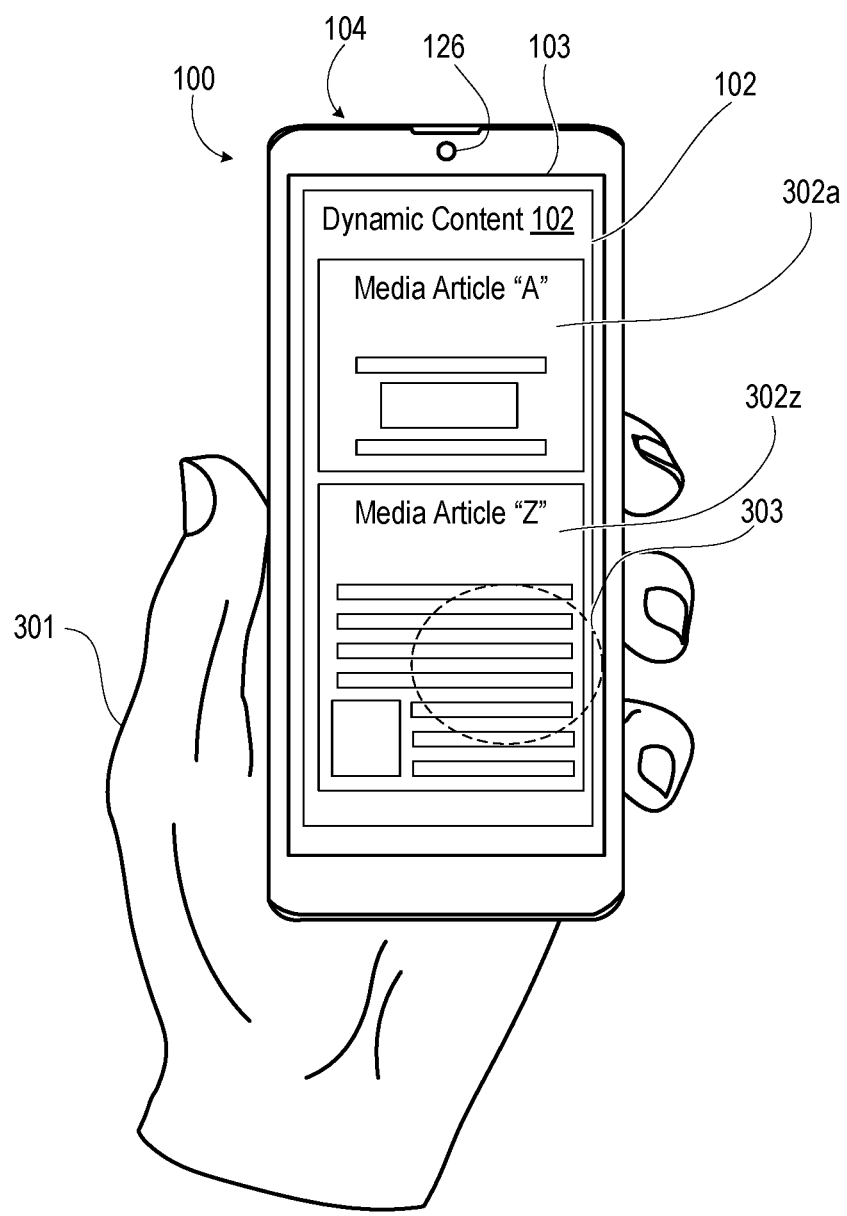
FIG. 3 depicts a front view of the communication device of FIG. 1 in a hand of a user consuming content presented on a display of the communication device, according to one or more embodiments.

FIG. 3 depicts a front view of communication device 100 in hand 301 of a user consuming content presented on display device 103 of communication device 100. Display device 103 presents dynamic content 102 that can have multiple portions 302a-302z, some of which can be viewed simultaneously or sequentially. Each portion 302a-302z of dynamic content 102 can have a different quantity or density of information, which requires a corresponding different amount of time for a user to focus his/her attention on the information versus quickly scanning the information. Image capturing device 126 can be a front camera that detects a gaze or focus by the user on (i.e., the user paying attention to) a particular portion 303 of dynamic content 102. In one or more embodiments, controller 101 (FIG. 1) has privileged access to rendering of graphical information on display device 103. Controller 101 is given privileged (higher level) access at a system level to data and functional components, where such privileged access is not necessarily afforded to applications. The privileged access enables bitmap screenshot capture of one of (i) particular portion 303, (ii) portion 302z ("media article "Z") that encompasses particular portion 303, or (iii) an entire presentation that includes other portions 302a ("media article "A") as well as particular portion 303. In one or more embodiments, in response to detecting gaze or focus by the user to particular portion 303 for a requisite period of time, controller 101 (FIG. 1) performs one or more of optical character recognition (OCR), pattern recognition, object recognition, etc., to capture information associated with particular portion 303. In one or more embodiments, controller 101 (FIG. 1) has system-level privileged access to view hierarchy information about dynamic content 102. View hierarchy can include information associated with particular portion 303, such as local or network storage address, metadata, version history, summaries, reviews, etc.

According to aspects of the present disclosure, controller 101 (FIG. 1) operates in a non-intrusive and private manner in the background as one or more applications 114 provide dynamic content 102. The applications 114 can select dynamic content 102 based on several contextual criteria including user interests, user preferences, device settings, contacts, locations, time day, current events, etc. In other instances, user can select dynamic content 102 to present. A user may find some dynamic content 102 of interest but choose to not overtly tag or designate portions of dynamic content 102. In certain applications 114, such overt tagging or designations are not only exploitable by the provider of application 114 but can be visible to other users. The user may choose to preserve privacy. The user can also fail to tag or designate dynamic content 102 for later retrieval merely due to an oversight. Subsequently, the user may desire to reference or again review dynamic content 102 of interest; however, the user may encounter difficulty locating particular portions 303 due to the large quantity of dynamic content 102 that is browsed or due to a change occurring in dynamic content 102 by the time the dynamic content 102 is later accessed. Controller 101 (FIG. 1) infers what particular portions 303 are of interest to the user by detecting the amount of attention paid by the user to particular portions 303. In response to detecting user attention to particular portions 303, controller 101 (FIG. 1) stores some or all of the information of dynamic content 102 for later reference.

Figure 4:
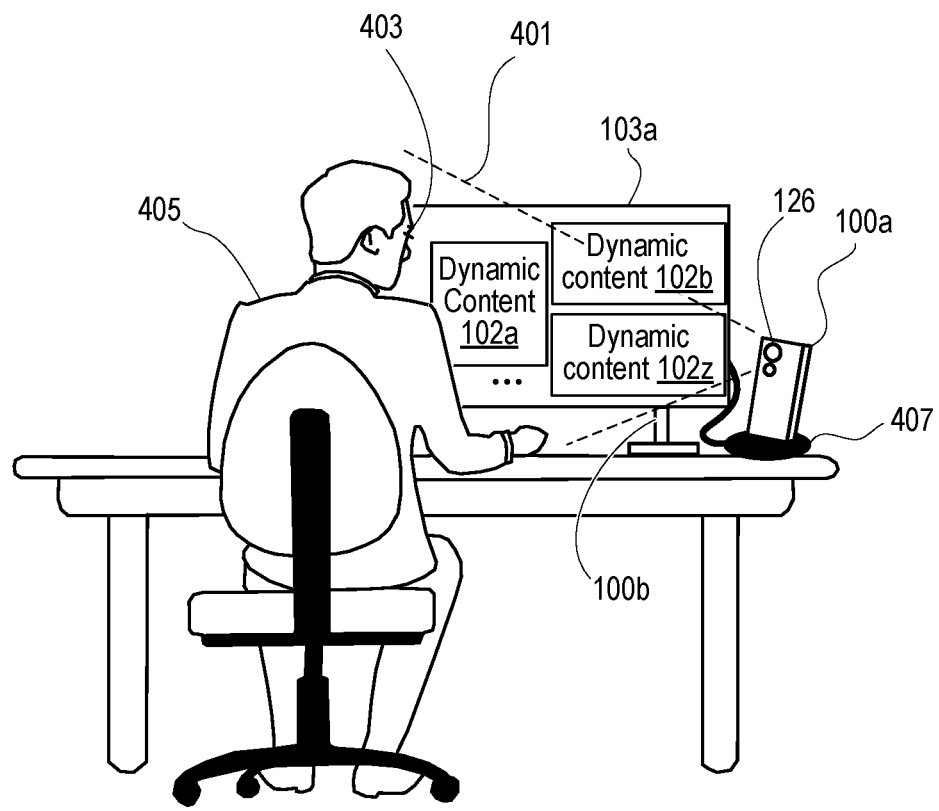
FIG. 4 presents a front view of a docked communication device positioned to have a field of view encompassing a face of a user viewing an external display device, according to one or more embodiments.

FIG. 4 presents a front view of docked communication device 100a positioned for image capturing device 126 to have field of view (FOV) 401 encompassing face 403 of user 405 viewing external display device 103a. In one or more embodiments, dock 407 is in a fixed or previously calibrated position relative to the external display device 103a. In one or more embodiments, the FOV 401 encompasses at least a portion of external display device 103a to calibrate face orientation relative to external display device 103a. In one or more embodiments, FOV 401 is sufficient for communication device 100a to determine that user 405 is viewing the external display device 103a but not a particular portion of what is presented on external display device 103a. According to one aspect, communication device 100a is a portable, mobile, or hand-held device positioned for stationary use in dock 407 next to external display device 103a. In one or more embodiments, external display device 103a is a television or display monitor. In one or more embodiments, external display device 103a is a display of second communication device 100b that is communicatively connected to communication device 100a. As one example, the first communication device 100a can have an image capturing device 126 but has a small display 103. For better content viewing, the content is projected to and/or presented on second communication device 100b, which can be a desktop workstation, laptop, or smart television, for example. Communication devices 100a-100b can have identical or similar components as previously described for communication device 100 (FIG. 1).

In an illustrative scenario, controller 101 (FIG. 1) accesses or creates a list of dynamic feed-based application or content providers that triggers aspects of the present disclosure. As an example, a user could benefit from collecting content from a social application but choose not to collect content from a non-social application. As another example, controller 101 (FIG. 1) may access and maintain settings that individually enable the present disclosure for each application. As an additional example, controller 101 (FIG. 1) can access metadata provided by a source provider of content to determine that the application presents dynamic content. Controller 101 (FIG. 1) triggers aspects of the present disclosure based on the determination of dynamic content. As yet another example, controller 101 (FIG. 1) can discern from prior sessions with each application, that content retrieved is dynamic, changing session to session. Controller 101 (FIG. 1) triggers aspects of the present disclosure based on the learned determination of dynamic content. Controller 101 (FIG. 1) determines that one application 114 is in a foreground of external display device 103*a*. Controller 101 (FIG. 1) performs aspects of the present disclosure to detect the user's attention to particular portions of application 114. In certain conventional communication devices, "attentive display" is a feature that is used to determine when to turn off the display. The conventional communication device detects when a user is looking generally at the display, which delays turning off the display in the same manner as touches to the display also cause a delay. The attentive display feature can be used in the absence of, or in addition to, detecting user overt interaction with presented content. In one or more aspects, the present disclosure enhances the attentive display by monitoring the length of time that the user consumes the current presentation of the dynamic content. In one or more embodiments, the present disclosure further enhances the attentive display feature by determining a particular portion of the current presentation of the dynamic content that is being consumed. The determined attention is more granular and delineated.

In response to determining consumption of a particular portion of dynamic content, information is obtained from application 114 or other components of communication device 100. As an example, a screenshot of a user interface of application 114 as presented on display device 103 is captured. As an additional example, text and associated information are obtained based on text or image recognition of the screenshot of the user interface. As another example, the information is obtained based on accessing metadata contained in an electronic document or file that is rendered to present the dynamic content 102. The information about the consumed dynamic content is stored for subsequent access.

In one or more embodiments, the stored information can be presented as a topical or chronological digest or index for user review and selection. In one or more embodiments, the stored information can be indexed for querying. Upon a subsequent launch of application 114, controller 101 (FIG. 1) can provide images or text to the user in response to a search for desired content. As an example, the user can readily retrieve previously presented content for subsequent posting on social media. In one or more embodiments, controller 101 (FIG. 1) can pull together information across multiple applications 114, assisting the user in finding particular dynamic content regardless of how originally viewed. As an example, the user may monitor multiple applications 114 for news and personal information. The user may not recall which particular application 114 provided content of interest. By automatically detecting and capturing content that has been consumed, the present disclosure assists in the user in locating previously consumed content.

Figure 5A:
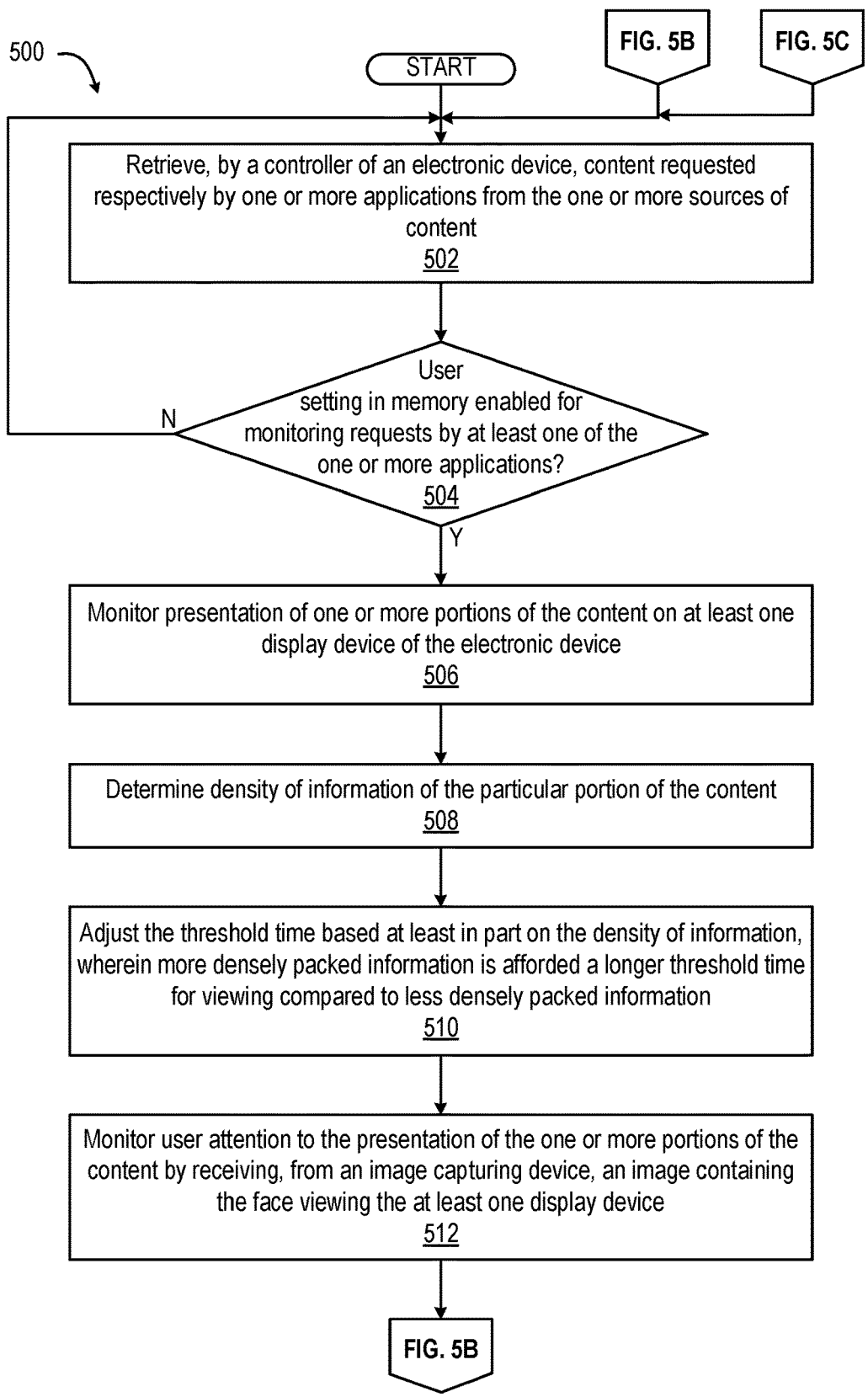
Figure 5B:
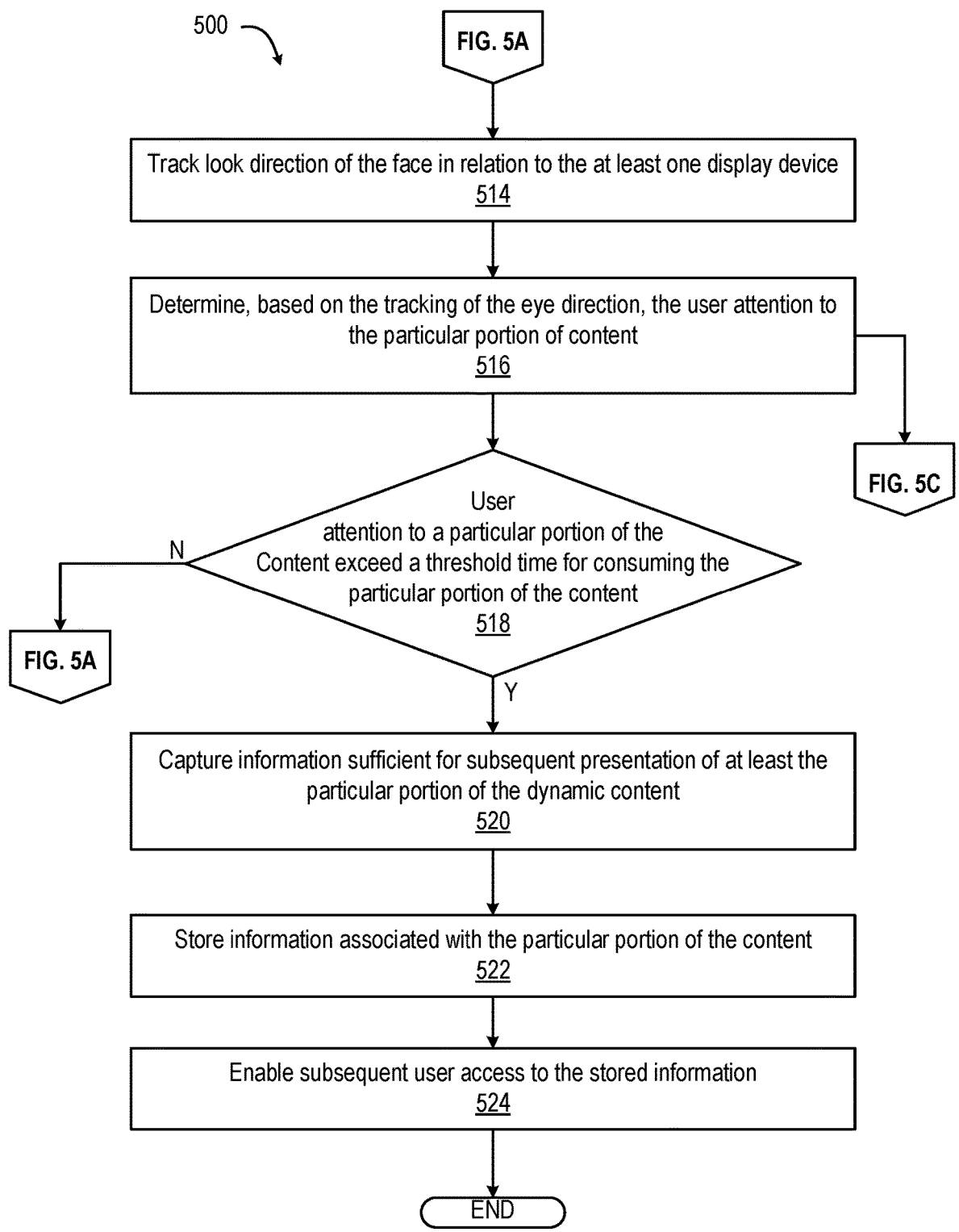

FIGS. 5A-5B (FIG. 5) present a flow diagram of method 500 for detecting user attention to dynamic content and enabling subsequent user access. The description of method 500 is provided with general reference to the specific components illustrated within the preceding FIGS. 1-3. In at least one embodiment, communication device 100, managed by controller 101, executes CCM application 109 (FIG. 1) to detect content consumption. Specific components referenced in method 500 can be identical or similar to components of the same name used to describe preceding FIGS. 1-4. With reference to FIG. 5A, method 500 includes retrieving, by a controller of an electronic device, content requested respectively by one or more applications from the one or more sources of content (block 502). Method 500 includes determining whether a user setting in memory is enabled for monitoring requests by at least one of the one or more applications (decision block 504). In an example, applications include social media applications, news applications, professional networking applications, browsers, etc. In response to determining that monitoring is not enabled for a currently executing application among the one or more applications presenting content on the at least one display, method 500 returns to block 502. In response to determining that monitoring is enabled for a currently executing application among the one or more applications presenting content on the at least one display, method 500 includes monitoring presentation of one or more portions of the content on at least one display device of the electronic device (block 506). Method 500 includes determining the density of the information provided within the particular portion of the content (block 508). Method 500 includes adjusting a threshold time for regular viewing of the content versus attentive viewing (block 510). Regular viewing is viewing for the amount of time required to decide whether the content is of interest. Regular viewing can be limited to reading heading and introductory portions. Regular viewing can be deemed "skimming", getting a sense of what the content contains. By contrast, attentive viewing requires a lengthier viewing that is sufficient to consume a substantial portion of the content. The amount of time required for regular and attentive viewing is based at least in part on the density of information, wherein more densely packed information is afforded a longer threshold time for viewing compared to less densely packed information. Method 500 includes identifying and monitoring user attention to the presentation of the one or more portions of the content by receiving, from an image capturing device, an image containing the face of the user with eyes focused on viewing the particular portion of content displayed/presented on at least one display device (block 512).

With reference to FIG. 5B, method 500 includes tracking an eye (gaze) direction of the face in relation to the at least one display device (block 514). Method 500 includes determining, based on the tracking of the eye direction, the user attention to the particular portion of content (block 516). Method 500 includes determining whether the user attention to a particular portion of the content exceeds a threshold time for regular/normal consumption of the particular portion of the content (decision block 518). In one example, regular and attentive consumption can be based on a default or customized reading speed of the user and the amount of reading presented in the content. A threshold time is based at least in part on what portion of the content could be meaningfully consumed. Regular consumption can be based on a time required for a typical person to read 5-29% of the content. Attentive consumption can be based on a time required for a typical person to read 30-100% of the content. In response to determining that the elapsed time associated with the user attention to a particular portion of the content does not exceed a threshold time for consuming the particular portion of the content, method 500 returns to block 502 (FIG. 5A). In response to determining that elapsed time for the user attention to a particular portion of the content exceeds a threshold time for consuming the particular portion of the content, method 500 includes capturing information sufficient for subsequent presentation of at least the particular portion of the dynamic content (block 520). Method 500 includes storing information associated with the particular portion of the content (block 522). Method 500 includes enabling subsequent user access to the stored information (block 524). Then method 500 ends.

FIG. 5C provides several different methods for completing the capturing of the content (block 520). In one or more embodiments, method 500 includes capturing a screenshot of the display device via an image capturing device (block 526). In one or more alternate embodiments, method 500 includes capturing a zoomed-in image of the particular portion of the content on the screen (block 528). In one or more embodiments, method 500 includes performing optical character recognition of the particular portion of the content (block 530). In one or embodiments, method 500 includes identifying and copying the metadata associated with the particular portion of the content (block 532). In one or more embodiments, method 500 includes identifying one or more of a date, a time, and a location of the particular portion of the content (block 534). In one or more embodiments, method 500 includes identifying and storing an access path of the particular portion of the content (block 536).

Figure 6:
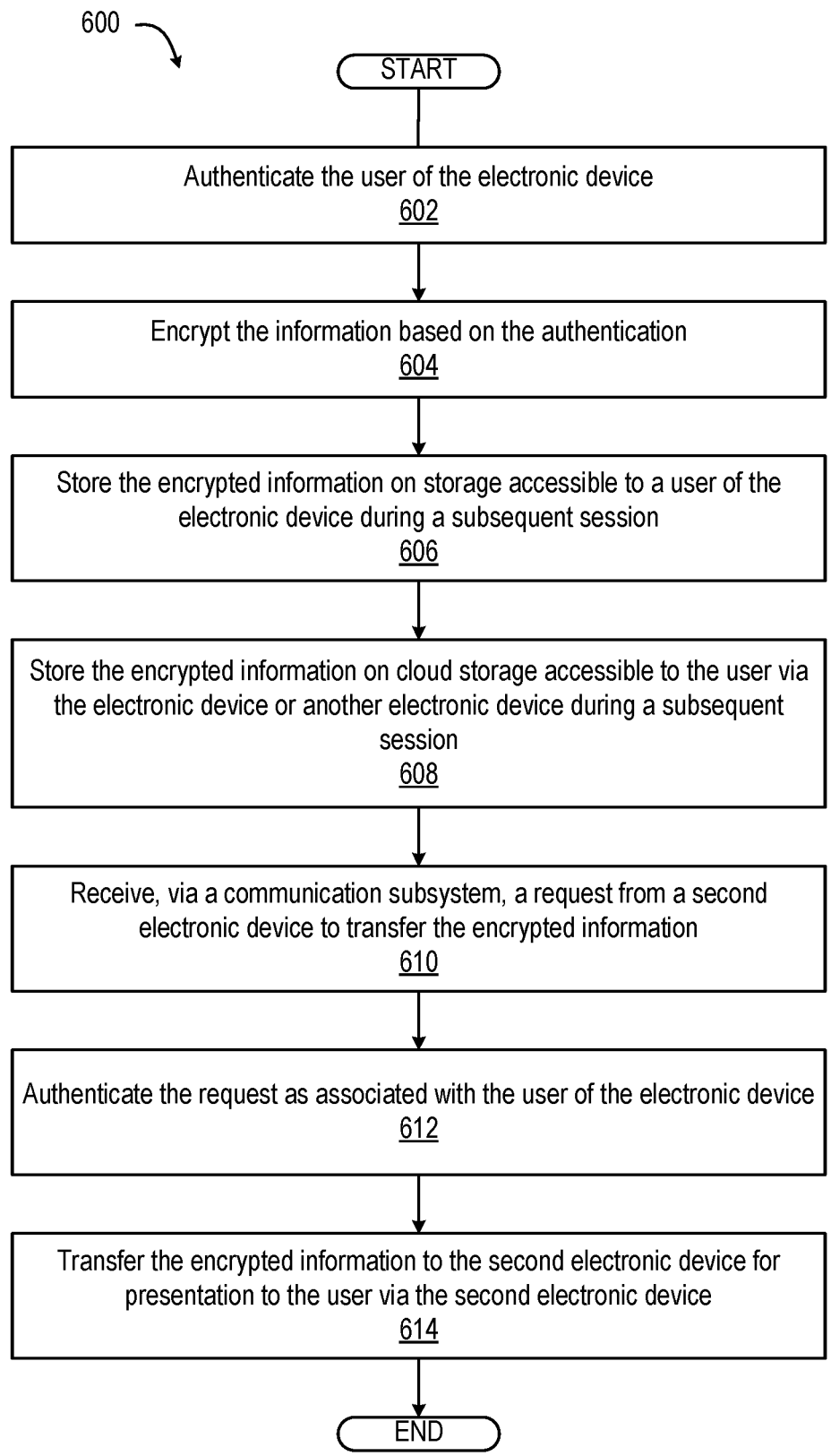
FIG. 6 presents a flow diagram of a method for enabling subsequent user access to the stored information via one or more paths, according to one or more embodiments.

FIG. 6 presents a flow diagram of method 600 for enabling subsequent user access to the stored information via one or more paths. The description of method 600 is provided with general reference to the specific components illustrated within the preceding FIGS. 1-4 and 5A-5B. In at least one embodiment, communication device 100, managed by controller 101, executes CCM application 109 (FIG. 1) to enable subsequent user access. Specific components referenced in method 600 can be identical or similar to components of the same name used to describe preceding FIGS. 1-4 and 5A-5C. Method 600 includes authenticating the user of the electronic device (block 602). Method 600 includes encrypting the information based on the authentication (block 604). In one or more embodiments, method 600 includes storing the encrypted information on storage that is accessible to a user of the electronic device during a subsequent session (block 606). In one or more embodiments, method 600 includes storing the encrypted information on cloud storage accessible to the user via the electronic device or another electronic device during a subsequent session (block 608). In one or more embodiments, method 600 includes receiving for example, a request from a second electronic device to transfer the encrypted information (block 610). Method 600 includes authenticating the request as associated with the user of the electronic device (block 612). Method 600 includes transferring the encrypted information to the second electronic device for presentation to the user via the second electronic device (block 614). Then method 600 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
    at least one display device;
    a memory containing a content consumption monitoring (CCM) application; and
    a controller communicatively coupled to the at least one display device and the memory and which executes the CCM application to configure the electronic device to:
        retrieve content from one or more sources of dynamic content;
        monitor presentation of one or more portions of the dynamic content on the at least one display device;
        monitor user attention to the presentation of the one or more portions of the dynamic content, the dynamic content being an aggregation of multiple viewable elements that are not readily tagged for later user access;

in response to detecting that a period of time associated with the user attention to a particular portion of the dynamic content exceeds a threshold time for consuming the particular portion of the dynamic content, store information that comprises one or more of: (i) a location of; (ii) a copy of; and (iii) metadata associated with the particular portion of the dynamic content;

pulls together information across multiple applications to assist the user in finding particular dynamic content regardless of how originally viewed;

indexes the stored information for querying via user entry of a search for desired content, wherein the information comprises a view hierarchy having: (i) text representations describing each viewable element presented by the at least one display device; (ii) location of viewable elements; and (iii) properties of the viewable elements; and enable subsequent user access to the stored information, enabling a user to later retrieve and view the dynamic content when the dynamic content has been updated or removed.

2. The electronic device of claim 1, further comprising a communication subsystem having a network interface, the communication subsystem communicatively coupled to the controller and communicatively connectable, via the network interface and a network, to the one or more sources of dynamic content, and the controller configures the electronic device to retrieve the dynamic content from the one or more sources that are network-connected to the electronic device via the network interface.

3. The electronic device of claim 1, wherein:
prior to storing the information the controller performs one or more of: (i) capturing a screenshot via an image capturing device; (ii) capturing a zoomed-in image of the particular portion of the dynamic content on the screen; (iii) performing optical character recognition of the particular portion of the dynamic content; (iv) identifying and copying the metadata associated with the particular portion of the dynamic content; (v) identifying one or more of a date, a time, and a location of a viewing of the particular portion of the dynamic content; and (vi) identifying an access path of the particular portion of the dynamic content.

4. The electronic device of claim 1, wherein the controller:
determines density of information of the particular portion of the dynamic content; and
adjusts the threshold time based at least in part on the density of information, wherein more densely packed information is afforded a longer threshold time for viewing compared to less densely packed information.

5. The electronic device of claim 1, further comprising an image capturing device communicatively coupled to the controller and positioned to have a field of view encompassing a face viewing the at least one display device, wherein the controller:
receives, from the image capturing device, an image containing the face;
tracks look direction of the face in relation to the at least one display device; and
determine, based on the tracking of the eye direction, the user attention to the particular portion of dynamic content.

6. The electronic device of claim 1, wherein the controller:
authenticates the user of the electronic device;
encrypts the information based on the authentication;
stores the encrypted information; and
enables subsequent access by the user to the encrypted information, only in response to authentication of the user submitting a request for access to the stored encrypted information.

7. The electronic device of claim 6, further comprising a communication subsystem communicatively coupled to the controller and communicatively connectable to the one or more sources of dynamic content via a network, wherein the controller:
receives, via the communication subsystem, a request from a second electronic device to transfer the encrypted information;
authenticates the request as associated with the user of the electronic device; and
in response to authenticating the request as associated with the user, transfers the encrypted information to the second electronic device for presentation to the user via the second electronic device.

8. The electronic device of claim 1, wherein:
the memory contains one or more applications stored in memory and executed by the controller to request and present the dynamic content; and
the controller:
determines whether a user setting in memory is enabled for monitoring requests by at least one of the one or more applications; and
stores the information identifying the particular portion of the content further in response to determining that monitoring is enabled for a currently executing application among the one or more applications presenting dynamic content on the at least one display.

9. A method comprising:
retrieving, by a controller of an electronic device, content requested respectively by a first and at least one second application from one or more sources of dynamic content;
monitoring presentation of one or more portions of the dynamic content on at least one display device of the electronic device;
monitoring user attention to the presentation of the one or more portions of the dynamic content, the dynamic content being an aggregation of multiple viewable elements that are not readily tagged for later user access;
in response to detecting that a period of time associated with the user attention to a particular portion of the dynamic content exceeds a threshold time for consuming the particular portion of the dynamic content, storing information that comprises one or more of: (i) a location of; (ii) a copy of; and (iii) metadata associated with the particular portion of the dynamic content;
pulls together information across multiple applications to assist the user in finding particular dynamic content regardless of how originally viewed;
indexes the stored information for querying via user entry of a search for desired content, wherein the information comprises a view hierarchy having: (i) text representations describing each viewable element presented by the at least one display device; (ii) location of viewable elements; and (iii) properties of the viewable elements; and enabling subsequent user access to the stored information, enabling a user to later retrieve and view the dynamic content when the dynamic content has been updated or removed.

10. The method of claim 9, wherein:
prior to storing the information, the method further comprises performing one or more of:
(i) capturing a screenshot via an image capturing device; (ii) capturing a zoomed-in image of the particular portion of the dynamic content on the screen; (iii) performing optical character recognition of the particular portion of the dynamic content; (iv) identifying and copying the metadata associated with the particular portion of the dynamic content; (v) identifying one or more of a date, a time, and a location of a viewing of the particular portion of the dynamic content; and
(vi) identifying an access path of the particular portion of the dynamic content.

11. The method of claim 9, further comprising:
determining density of information of the particular portion of the dynamic content; and
adjusting the threshold time based at least in part on the density of information, wherein more densely packed information is afforded a longer threshold time for viewing compared to less densely packed information.

12. The method of claim 9, further comprising:
receiving, from an image capturing device, an image containing the face viewing the at least one display device;
tracking look direction of the face in relation to the at least one display device; and
determining, based on the tracking of the eye direction, the user attention to the particular portion of dynamic content.

13. The method of claim 9, further comprising:
authenticating the user of the electronic device;
encrypting the information based on the authentication;
storing the encrypted information; and
enabling subsequent access by the user to the encrypted information only in response to authentication of the user submitting a request for access to the stored encrypted information.

14. The method of claim 13, further comprising:
receiving, via a communication subsystem, a request from a second electronic device to transfer the encrypted information;
authenticating the request as associated with the user of the electronic device; and
in response to authenticating the request as associated with the user, transferring the encrypted information to the second electronic device for presentation to the user via the second electronic device.

15. The method of claim 9, further comprising:
determining whether a user setting in memory is enabled for monitoring requests by at least one of the one or more applications;
storing the information identifying the particular portion of the dynamic content further in response to determining that monitoring is enabled for a currently executing application among the one or more applications presenting dynamic content on the at least one display.

16. A computer program product comprising:
a computer readable storage device; and
program code on the computer readable storage device that when executed by a processor associated with a communication device, the program code enables the communication device to provide the functionality of:
retrieving, by a controller of an electronic device, dynamic content requested respectively by a first and at least one second application from the one or more sources of dynamic content;
monitoring presentation of one or more portions of the dynamic content on at least one display device of the electronic device;
monitoring user attention to the presentation of the one or more portions of the dynamic content, the dynamic content being an aggregation of multiple viewable elements that are not readily tagged for later user access;
in response to detecting that a period of time associated with the user attention to a particular portion of the dynamic content exceeds a threshold time for consuming the particular portion of the dynamic content, storing information that comprises one or more of: (i) a location of; (ii) a copy of; and (iii) metadata associated with the particular portion of the dynamic content;
pulling together information across multiple applications to assist the user in finding particular dynamic content regardless of how originally viewed; and
indexing the stored information for querying via user entry of a search for desired content, wherein the information comprises a view hierarchy having: (i) text representations describing each viewable element presented by the at least one display device; (ii) location of viewable elements; and (iii) properties of the viewable elements; and
enabling subsequent user access to the stored information, enabling a user to later retrieve and view the dynamic content when the dynamic content has been updated or removed.

17. The computer program product of claim 16, wherein the program code enables the communication device to provide the functionality of:
monitoring presentation of the one or more portions of the dynamic content on the at least one display device comprises monitoring and storing content across a content ecosystem by leveraging system access to one or more of multiple windows, multiple sub-windows and panels of an application, multiple applications, and multiple display devices, to independently obtain information about the various content; and
performing one or more of: (i) capturing a screenshot via an image capturing device; (ii) capturing a zoomed-in image of the particular portion of the dynamic content on the screen; (iii) performing optical character recognition of the particular portion of the dynamic content; (iv) identifying and copying the metadata associated with the particular portion of the dynamic content; (v) identifying one or more of a date, a time, and a location of a viewing of the particular portion of the dynamic content; and (vi) identifying an access path of the particular portion of the dynamic content.

18. The computer program product of claim 16, wherein the program code enables the communication device to provide the functionality of:
determining density of information of the particular portion of the dynamic content; and
adjusting the threshold time based at least in part on the density of information, wherein more densely packed information is afforded a longer threshold time for viewing compared to less densely packed information.

19. The computer program product of claim 16, wherein the program code enables the communication device to provide the functionality of:
  receiving, from an image capturing device, an image containing the face viewing the at least one display device;
  tracking look direction of the face in relation to the at least one display device; and
  determining, based on the tracking of the eye direction, the user attention to the particular portion of dynamic content.

* * * * *